U. G. DAVIDSON.
MILKING MACHINE.
APPLICATION FILED FEB. 1, 1917.

1,249,345.

Patented Dec. 11, 1917.

Inventor
U. G. Davidson
By Watson E. Coleman
Attorney

UNITED STATES PATENT OFFICE.

ULYSSES G. DAVIDSON, OF ALGONA, IOWA.

MILKING-MACHINE.

1,249,345.　　　　　Specification of Letters Patent.　　Patented Dec. 11, 1917.

Application filed February 1, 1917. Serial No. 145,950.

*To all whom it may concern:*

Be it known that I, ULYSSES G. DAVIDSON, a citizen of the United States, residing at Algona, in the county of Kossuth and State of Iowa, have invented certain new and useful Improvements in Milking-Machines, of which the following is a specification, reference being had to the accompanying drawings.

This invention relates to milking machines and particularly to those machines wherein teat cups are used. The general object of the invention is to provide means for giving an upward and downward movement to the teat cups so as to thereby massage the udder of the cow and give a motion to the teat cups in imitation of the human hand in milking.

A further object of the invention is to provide a very simple mechanism for this purpose, readily operated, readily connected to any of the ordinary forms of machine using teat cups and which machine may be readily transported from place to place in the barn and readily connected to the teat cups which it is desired to operate.

Other objects will appear in the course of the following description.

My invention is illustrated in the accompanying drawings, wherein.

Figure 1:
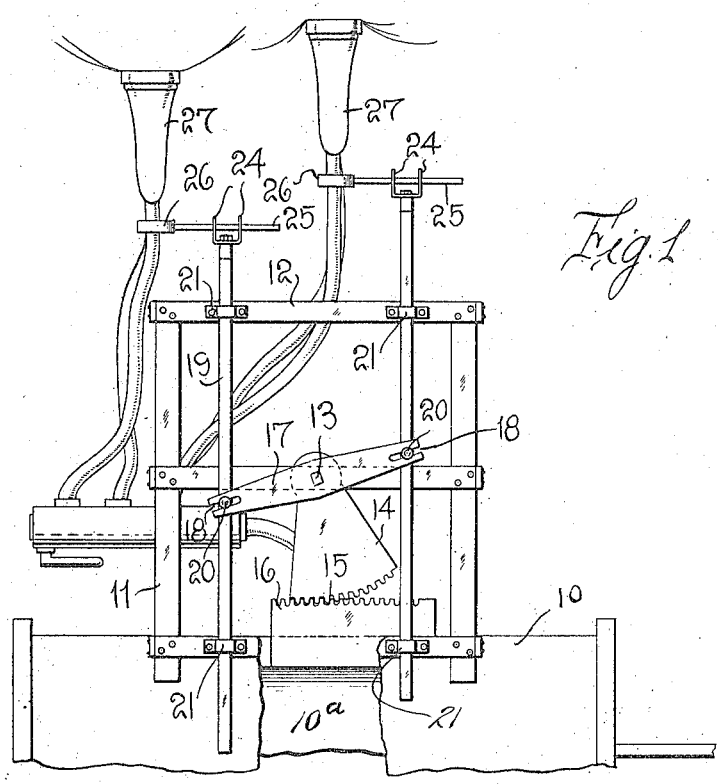
Figure 1 is a side elevation of a pulsator with my invention applied thereto and showing it operating the teat cups of a milking machine.
Figure 2:
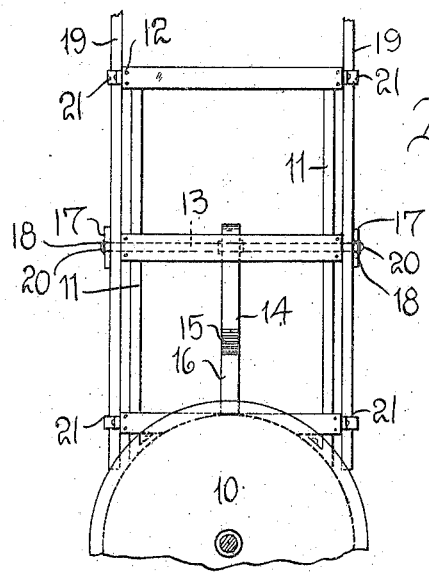
Fig. 2 is an end elevation of the construction shown in Fig. 1.
Figure 3:
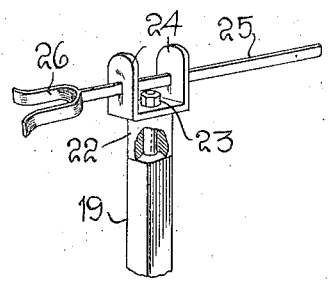
Fig. 3 is a perspective view of one of the rods 19 showing the fork and fork holder at the upper end of the rod.

Referring to these drawings, 10 designates a pulsator of any suitable character and having thereon the uprights 11 connected by longitudinally extending rails 12. Mounted on the rails 12 is a transversely extending shaft 13 and mounted upon this shaft to rotate therewith is a sector gear 14 having teeth 15 adapted to mesh with the teeth of a rack 16, this rack being adapted to be reciprocated by the piston 10ª of the pulsator 10 and being slidably mounted to this end. Also mounted upon the shaft 13 are the oppositely disposed approximately parallel walking beams 17 each of which is slotted at its ends as at 18. Slidably mounted upon the bars 12 are the vertically disposed reciprocating rods 19 which are provided with bolts or pins 20 engaging in the slots 18 of the walking beams. These vertically disposed rods 19 are mounted in guides 21 attached to the rails 12.

The upper end of each rod has bolted to it a forked holder, this forked holder having a tubular shank 22 adapted to rest upon the upper end of the corresponding rod 19 and be held thereto by a bolt and nut 23. The holder is provided with oppositely disposed upwardly extending wings 24 and passing through these wings is the flattened shank 25 of a fork having tines 26, these tines being bowed away from each other, then slightly contracted and outwardly extended. These tines are adapted to embrace the length of hose at the base of the teat cups 27, so that as the forks are raised and lowered by the reciprocations of their respective rods 19, an upward and downward movement will be communicated to the teat cups in imitation of the motion of the human hand in milking.

It will be seen that the shanks 25 may be adjusted longitudinally through the ears 24 and that the device supporting the shanks 25 may be rotated upon the bolt 23 and that this provides for various adjustments of the forks 26 so as to be disposed beneath the teats. The pulsator 10 is designed to be mounted upon the cover of a pail in the usual manner and I do not wish to limit myself to the particular form of pulsator shown as the device may be used with different forms of pulsators or need not necessarily be operated by a rack 16 mounted upon the piston of the pulsator but the rack 16 might be operated by other means.

From the above description, it is obvious that I have provided a device which will give a slight reciprocation to the teat cups and thereby cause the teat cups to simulate more closely the action of the human hand in milking and which will, therefore, cause to a certain extent the massaging of the udder of the cow which will tend to increase the supply of milk. It will also be obvious that many changes may be made in the details of construction of this device without departing from the spirit of the invention.

Where an ordinary pulsator is used, such as commonly found in this type of milking machines, it is only necessary in order to attach the rack that a portion of the outside casing of the pulsator be cut away and the rack attached to the inner tube or piston by riveting or like means. The milk tubes from the teat cups are handled in the usual manner necessary for the particular type of machine on which this device may be used, it being only necessary to shorten the tubes or lengthen them, as the case may be, in order to secure a proper operation of the device. It will be seen that the pulsator in addition to the use which it ordinarily performs is also put to the additional purpose of operating the rods 19.

Having described my invention, what I claim is:

1. Means for giving reciprocatory movement to the teat cups of milking machines including a supporting frame, vertically disposed rods mounted upon the supporting frame and having means for detachably engaging teat cups, and means for simultaneously reciprocating the rods in opposite directions.

2. In a mechanism of the character described, a supporting frame, vertically disposed rods mounted upon the frame for vertical reciprocation, means for oscillating said rods, and means on the upper ends of the rods for operatively engaging the teat cups of a milking machine comprising a resilient fork adapted to embrace the hose leading from the teat cup.

3. In a device of the character described, a supporting frame, vertically disposed rods mounted upon the frame for vertical sliding movement having means at their upper ends for detachably engaging with the teat cups, a walking beam mounted on the frame and having its ends operatively connected to the rods, and means for oscillating said walking beam.

4. In a device of the character described, a supporting frame, vertically disposed rods mounted upon the frame for vertical sliding movement having means at their upper ends for detachably engaging with the teat cups, a walking beam mounted on the frame and having its ends operatively connected to the rods, means for oscillating said walking beam including a sector gear, a pivot member on which the sector gear is mounted and which is operatively connected to the walking beam, and a reciprocating rack operatively connected to the sector gear.

5. In a device of the character described, a pulsator having a reciprocating element, a rack mounted upon the pulsator and connected to the reciprocating element for movement therewith, a vertical frame supported upon the pulsator, vertically disposed rods mounted upon the frame for vertical sliding movement, teat cup engaging devices mounted upon the upper ends of the rods, and means engaged by the rack for reciprocating said rods alternately in opposite directions.

In testimony whereof I hereunto affix my signature in the presence of two witnesses.

ULYSSES G. DAVIDSON.

Witnesses:
H. L. GILMORE,
W. H. SCHOBY.

Copies of this patent may be obtained for five cents each, by addressing the "Commissioner of Patents, Washington, D. C."